United States Patent [19]
Hanson

[11] Patent Number: 5,946,493
[45] Date of Patent: Aug. 31, 1999

[54] METHOD AND SYSTEM IN A DATA PROCESSING SYSTEM FOR ASSOCIATION OF SOURCE CODE INSTRUCTIONS WITH AN OPTIMIZED LISTING OF OBJECT CODE INSTRUCTIONS

[75] Inventor: Scott P. Hanson, Rochester, Minn.

[73] Assignee: International Business Machines Corporation, Armonk, N.Y.

[21] Appl. No.: 08/826,033

[22] Filed: Mar. 28, 1997

[51] Int. Cl.⁶ .................................................. G06F 9/45
[52] U.S. Cl. .................... 395/709; 395/708; 395/706; 345/357
[58] Field of Search ................................. 345/700, 710, 345/500, 704, 507, 357; 364/419, 300; 395/275, 375, 575, 707, 702, 704, 708, 709

[56] References Cited

U.S. PATENT DOCUMENTS

| | | | |
|---|---|---|---|
| 4,025,901 | 5/1977 | Bachman et al. ........................... | 707/3 |
| 4,567,574 | 1/1986 | Saade et al. . | |
| 5,280,613 | 1/1994 | Chan et al. . | |
| 5,307,478 | 4/1994 | Rashold et al. ........................ | 395/500 |
| 5,317,511 | 5/1994 | Jacobson ................................ | 345/357 |
| 5,339,419 | 8/1994 | Chan et al. . | |
| 5,339,431 | 8/1994 | Rupp et al. ............................. | 395/710 |
| 5,371,747 | 12/1994 | Brooks et al. . | |
| 5,442,790 | 8/1995 | Nosenchuck . | |
| 5,450,585 | 9/1995 | Johnson . | |
| 5,469,572 | 11/1995 | Taylor .................................... | 395/710 |
| 5,481,708 | 1/1996 | Kukol . | |
| 5,493,675 | 2/1996 | Faiman, Jr. et al. ..................... | 395/709 |
| 5,530,870 | 6/1996 | De Bruler . | |
| 5,535,391 | 7/1996 | Hejlsberg et al. . | |
| 5,535,393 | 7/1996 | Reeve et al. . | |
| 5,555,412 | 9/1996 | Besaw et al. . | |
| 5,577,253 | 11/1996 | Blickstein . | |
| 5,600,790 | 2/1997 | Barnstijn et al. .................. | 395/183.14 |
| 5,613,117 | 3/1997 | Davidson et al. ....................... | 395/708 |
| 5,692,047 | 11/1997 | McManis .................................... | 380/4 |
| 5,713,010 | 1/1998 | Buzbee et al. .......................... | 345/507 |

*Primary Examiner*—Tariq R. Hafiz
*Attorney, Agent, or Firm*—Lisa B. Yociss; Andrew J. Dillon

[57] ABSTRACT

A method and system in a data processing system for associating source code instructions with an optimized listing of object code instructions are disclosed. Source code instructions are compiled utilizing an optimizing compiler to generate a listing of object code instructions. The object code instructions are included within the listing in an optimized sequence. One of the object code instructions is compared with a second plurality of object code instructions. The second plurality of object code instructions are all located after the one object code instruction in the listing. In response to the comparison, a determination is made whether a selection of the one object code instruction will prohibit selection of a third plurality of object code instructions. If a determination is made a selection of the one object code instruction will not prohibit selection of a third plurality of object code instructions, the one object code instruction is associated with one of the source code instructions.

24 Claims, 7 Drawing Sheets

23

* [10] foo(param1, param2, param3, param4); 24
* [11] a = b + c; 25
* [12] d = e + f; 26

28 — 10 - load reg0 = param1
29 — 10 - load reg1 = param2
30 — 10 - load reg2 = param3
31 — 10 - load reg3 = param4
32 — 10 - call foo
33 — 11 - load reg4 = b
34 — 11 - load reg5 = c
35 — 11 - add reg6 = reg4, reg5
36 — 11 - store a = reg6
37 — 12 - load reg7 = e
38 — 12 - load reg8 = f
39 — 12 - add reg9 = reg7, reg8
40 — 12 - store d = reg9

*Fig. 2B*

```
28  ─ 10 - load reg0 = param1
29  ─ 10 - load reg1 = param2
37  ─ 12 - load reg7 = e
33  ─ 11 - load reg4 = b
34  ─ 11 - load reg5 = c
41  ─ 100 - load reg30 = x
38  ─ 12 - load reg8 = f
39  ─ 12 - add reg9 = reg7, reg8
40  ─ 12 - store d = reg9
30  ─ 10 - load reg2 = param3
42  ─ 111 - add reg31 = reg 30, reg30
31  ─ 10 - load reg3 = param4
35  ─ 11 - add reg6 = reg4, reg5
36  ─ 11 - store a = reg6
32  ─ 10 - call foo
```

Fig. 2C

```
             ┌45
┌─────────────────────────────────────────┐
│                                         │
│      ┌── 10 - load reg0 = param1        │
│   28─┘                                  │
│      ┌── 12 - load reg7 = e             │
│   37─┘                                  │
│      ┌── 11 - load reg4 = b             │
│   33─┘                                  │
│      ┌──100 - load reg30 = x            │
│   41─┘                                  │
│      ┌── 12 - load reg8 = f             │
│   38─┘                                  │
│      ┌── 10 - load reg2 = param3        │
│   30─┘                                  │
│      ┌──111 - add  reg31 = reg 30, reg30│
│   42─┘                                  │
│      ┌── 10 - load reg3 = param4        │
│   31─┘                                  │
│      ┌── 11 - add  reg6 = reg4, reg5    │
│   35─┘                                  │
│      ┌── 10 - call foo                  │
│   32─┘                                  │
└─────────────────────────────────────────┘
```

*Fig. 2D*

```
                                    ┌46
24 ─┐     * [10] foo(param1, param2, param3, param4);
28 ─┐  10 - load reg0 = param1
29 ─┐  10 - load reg1 = param2
37 ─┐  12 - load reg7 = e
25 ─┐     * [11] a = b + c;
33 ─┐  11 - load reg4 = b
34 ─┐  11 - load reg5 = c
41 ─┐ 100 - load reg30 = x
26 ─┐     * [12] d = e + f;
38 ─┐  12 - load reg8 = f
39 ─┐  12 - add reg9 = reg7, reg8
40 ─┐  12 - store d = reg9
30 ─┐  10 - load reg2 = param3
42 ─┐ 111 - add reg31 = reg 30, reg30
31 ─┐  10 - load reg3 = param4
35 ─┐  11 - add reg6 = reg4, reg5
36 ─┐  11 - store a = reg6
32 ─┐  10 - call foo
```

*Fig. 2E*

METHOD AND SYSTEM IN A DATA PROCESSING SYSTEM FOR ASSOCIATION OF SOURCE CODE INSTRUCTIONS WITH AN OPTIMIZED LISTING OF OBJECT CODE INSTRUCTIONS

BACKGROUND

1. Technical Field

The depicted illustrative embodiment relates to data processing systems, and in particular to efficiently selecting optimized object code instructions within an optimized listing to be associated with source code instructions which were compiled by an optimizing compiler to generate the object code instructions. Still more particularly, the depicted illustrative embodiment relates to a method and system in a data processing system for comparing one of a plurality of object code instructions with a second plurality of object code instructions where the second plurality of object code instructions are all located after one object code instruction in an optimized listing of the plurality of object code instructions in order to efficiently select optimized object code instructions within the listing to be associated with source code instructions.

2. Description of the Related Art

In order for a computer to be able to execute a computer program written in a high-level language, the program must be compiled. The program includes the high-level language instructions, in a particular order, chosen by a programmer. These high-level instructions are also called the source code instructions.

When a program is compiled, the source code instructions are translated into machine instructions. The machine instructions are also called object code instructions. Therefore, source code is compiled into object code. Each source code instruction will typically have one or more associated object code instructions. Some source code instructions will not be associated with any object code because the source code may be a comment or because the compiler was unable for various reasons to compile that particular source code instruction.

As a result of the compilation, a listing may be created which includes the object code instructions in a particular sequence which is related to the sequence of the associated source code instructions. The listing can be used by the programmer to debug the program, investigate performance problems, and analyze the quality of the compiled object code, among other things.

In order to better analyze the listing, a programmer may desire to have source code instructions printed along with the object code instructions. One known technique for accomplishing this has been to associate a line number with each line of source code. Prior to printing the listing, each line of source code is printed along with the line's associated line number. Then, the listing of object code instructions is printed. Each line of object code is associated with one line of source code, and thereby also associated with the line number of that line of source code. Each line of object code is then printed along with the associated line number. However, because all of the source code is printed before all of the object code, it may be very difficult, especially in large programs, to quickly view an object code instruction and its associated source code instruction.

Another technique is to include source code instructions within the listing. Therefore, a line of source code may be printed between several lines of the object code included within the listing. A line of source code may be printed immediately prior to the lines of object code generated by compiling that line of source code.

A problem exists with this method, however, when an optimizing compiler is utilized to compile the source code. An optimizing compiler compiles the source code into object code and then may rearrange the sequence of the object code instructions to produce optimized object code which will be processed faster by the data processing system. The listing generated by the optimizing compiler will include object code instructions in the new, optimized, sequence. The new, optimized sequence may have little resemblance to the original sequence of the source code. Therefore, it becomes very cumbersome to print source code instructions along with a listing of optimized object code instructions.

Therefore a need exists for a method and system to efficiently select optimized object code instructions to be associated with source code instructions which were compiled utilizing an optimizing compiler to generate the object code instructions.

SUMMARY

It is therefore one object of the depicted illustrative embodiment to provide an improved data processing system.

It is another object of the illustrative embodiment to provide a method and system for efficiently associating source code instructions with an optimized listing of object code instructions which were generated by compiling the source code instructions within a data processing system.

It is yet another object of the illustrative embodiment to provide a method and system in a data processing system for comparing one of a plurality of object code instructions with a second plurality of object code instructions where the second plurality of object code instructions are all located after one object code instruction in an optimized listing of the plurality of object code instructions in order to efficiently select optimized object code instructions within the listing to be associated with source code instructions.

The foregoing objects are achieved as is now described. A method and system in a data processing system for associating source code instructions with an optimized listing of object code instructions are disclosed. Source code instructions are compiled utilizing an optimizing compiler to generate a listing of object code instructions. The object code instructions are included within the listing in an optimized sequence. One of the object code instructions is compared with a second plurality of object code instructions. The second plurality of object code instructions are all located after the one object code instruction in the listing. In response to the comparison, a determination is made whether a selection of one object code instruction will prohibit selection of a third plurality of object code instructions. If a determination is made a selection of one object code instruction will not prohibit selection of a third plurality of object code instructions, the one object code instruction is associated with one of the source code instructions.

The above as well as additional objectives, features, and advantages of the illustrative embodiment will become apparent in the following detailed written description.

BRIEF DESCRIPTION OF THE DRAWINGS

The novel features are set forth in the appended claims. The illustrative embodiment itself, however, as well as a preferred mode of use, further objectives and advantages thereof, will best be understood by reference to the following detailed description of an illustrative embodiment when read in conjunction with the accompanying drawings, wherein:

FIG. 2A illustrates a pictorial representation of a display screen displaying a plurality of source code instructions in accordance with the method and system of the present invention;

FIG. 2B depicts a pictorial representation of a display screen displaying a plurality of un-optimized object code instructions generated by compiling the plurality of source code instructions of FIG. 2A in accordance with this method and system of the present invention;

FIG. 2C illustrates a pictorial representation of a display screen displaying an optimized compiler listing including a plurality of object code instructions which were generated by compiling the source code instructions of FIG. 2A in accordance with this method and system of the present invention;

FIG. 2D depicts a buffer including a modified optimized compiler listing including object code instructions in accordance with the method and system of the present invention;

FIG. 2E depicts a pictorial representation of a display screen displaying an optimized compiler listing including a plurality of object code instructions which were generated by compiling the source code instructions of FIG. 2A, and an annotation of selected lines of object code instructions with source code instructions in accordance with the method and system of the present invention.

DETAILED DESCRIPTION OF ILLUSTRATIVE EMBODIMENT

An exemplary embodiment of the present invention and its advantages are better understood by referring to FIGS. 1–3B of the drawings, like numerals being used for like and corresponding parts of the accompanying drawings.

Figure 1:
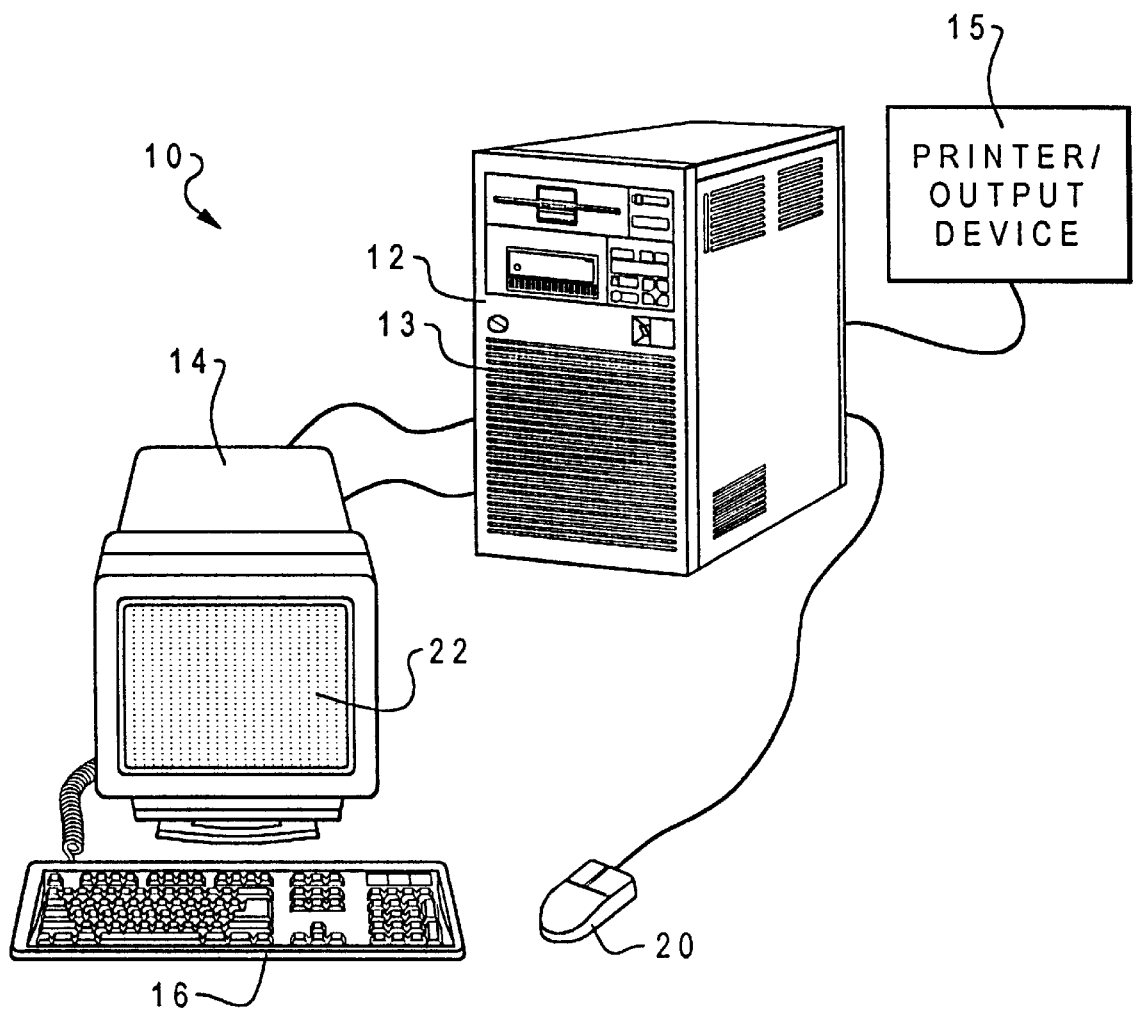
FIG. 1 depicts a high level block diagram of a data processing system 10 which may be utilized to implement the method and system of the illustrative embodiment.

With reference now to the figures and in particular with reference to FIG. 1, there is depicted a pictorial representation of a data processing system 10 which may be utilized to implement the method and system of the present invention. In a preferred embodiment, data processing system 10 may include a plurality of computers which may be connected together in a local area network. Of course, those skilled in the art will appreciate that a plurality of intelligent workstations coupled to a host processor may be utilized to implement such network.

As is common in such data processing systems, data processing system 10 includes a CPU 12 which may be coupled to a storage device 13 and/or a printer/output device 15. One or more such storage devices may be utilized to store the various data objects or files which may be periodically accessed, processed, and presented within data processing system 10 in accordance with the method and system of the present invention. In a manner well known in the prior art, each such data processing document or file may be stored within a storage device which may be associated with a resource manager or library service, which is responsible for maintaining and updating all resource objects associated therewith.

Data processing system 10 may be implemented utilizing any suitably configured personal computer, mini computer, mainframe computer, or a computer running in a distributed network of other computers. Data processing system 10 may include a number of software programs. One such program is a compiler for compiling source code instructions in order to generate object code instructions. Data processing system 10 has associated therewith a computer display 14 which includes a display screen 22, a keyboard 16, and an input pointing device, such as a mouse, 20.

FIG. 2A illustrates a pictorial representation of display screen 22 displaying a plurality of source code instructions 23 in accordance with the method and system of the present invention. For simplicity, only three lines of source code instructions are illustrated. Source code instruction 24 is associated with line number "10". Source code instruction 25 is associated with line number "11". And, source code instruction 26 is associated with line number "12". Those in the art will recognize that any number of source code instructions may be included.

Plurality of source code instructions 23 may be compiled in order to generate object code instructions. FIG. 2B depicts a pictorial representation of display screen 22 displaying an un-optimized listing of a plurality of object code instructions 27 generated by compiling plurality of source code instructions 23. For example, source code instruction 24 was compiled to generate object code instructions 28, 29, 30, 31, and 32. Source code instruction 25 was compiled to generate object code instructions 33, 34, 35, and 36. And, source code instruction 26 was compiled to generate object code instructions 37, 38, 39, and 40.

Object code instructions 28, 29, 30, 31, and 32 are associated with line number "10" to indicate that source code instruction 24 was compiled to generate these object code instructions. Object code instructions 33, 34, 35, and 36 are also associated with line number "11" to indicate that source code instruction 25 was compiled to generate these object code instructions. And, object code instructions 37, 38, 39, and 40 are associated with line number "12" to indicate that source code instruction 26 was compiled to generate these object code instructions.

FIG. 2C illustrates a pictorial representation of display screen 22 displaying an optimized compiler listing 44 including plurality of object code instructions 27 which were generated by compiling plurality of source code instructions 23. Because listing 44 is generated utilizing an optimizing compiler, the sequence of the object code instructions is also optimized. When the sequence of instructions is optimized, as shown in FIG. 2C, the object code instructions become reordered from an original sequence, which is shown in FIG. 2B. In the optimized sequence, instructions which were originally located much further down the list, such as object code instructions 41 and 42, may now be located mixed in with instructions originally located closer to the beginning of the list.

FIG. 2D depicts a buffer 45 including a modified optimized compiler listing including object code instructions in accordance with the method and system of the present invention.

FIG. 2E depicts a pictorial representation of display screen 22 displaying an optimized compiler listing 46 which includes plurality of object code instructions 27 which were generated by compiling plurality of source code instructions 23, and an annotation of selected lines of object code instructions with source code instructions in accordance with the method and system of the present invention.

Optimized compiler listing 46 includes an annotation for selected lines of object code instructions. Therefore, a selection must be made of the object code instructions to be annotated. In order to make the selection, the lines of object code instructions included within the listing 44 are examined. When there are consecutive lines of object code instructions which have the same line number, only the first line of object code is saved.

For example, buffer 45, shown in FIG. 2D, includes a modified optimized compiler listing including only the first line of object code having consecutive identical line numbers. Listing 44 has been compressed and stored in buffer 45. Lines 29, 34, 39, 40, and 36 are not included within buffer 45. In this manner, storage space in the buffer is conserved. In addition, the additional lines of object code do not provide any information useful to a determination of which lines of object code should be annotated.

The first object instruction in the sequence will be annotated. After that, lines numbers equal to or less than the line number of the first instruction will not be annotated. For object code instructions having line numbers which are greater than the line number of the last annotated line of object code, a determination is made whether the line should be annotated.

In order to determine if these lines of object code should be annotated, all instructions located in the listing after the current instruction being considered are reviewed. If annotation of the current line would prevent annotation of more than one instruction which is located after the current instruction in the optimized listing in the optimized sequence, annotation is not done. The resulting listing including annotation is shown in FIG. 2E.

Instruction 28 is annotated by printing source code instruction 24 just above instruction 28. Instruction 29 is not annotated because it has a line number equal to the line number of the last instruction which was annotated. Instruction 37 is not annotated, even though it has a line number greater than the line number of the last instruction which was annotated, because annotation of instruction 37 would prevent annotation of lines 33, 34, 30, 31, 35, 36, and 32. The flow chart of FIGS. 3A and 3B is utilized to select other lines of object code instructions to be annotated to create annotated listing 46.

Figure 3A:
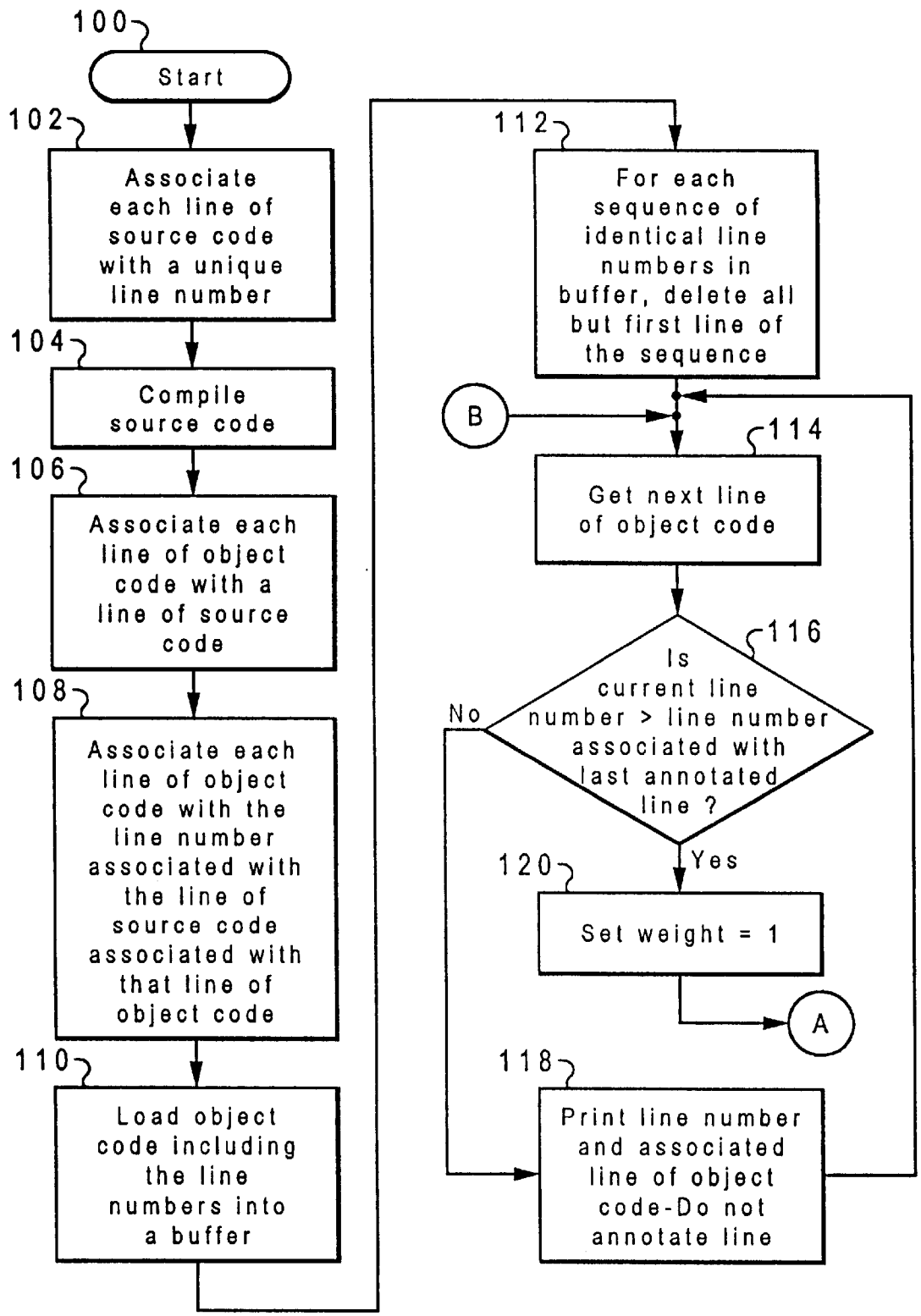
FIG. 3A and 3B together are a high level flow chart depicting the efficient selection of object code instructions to be associated with source code instructions in accordance with the method and system of the present invention.
Figure 3B:
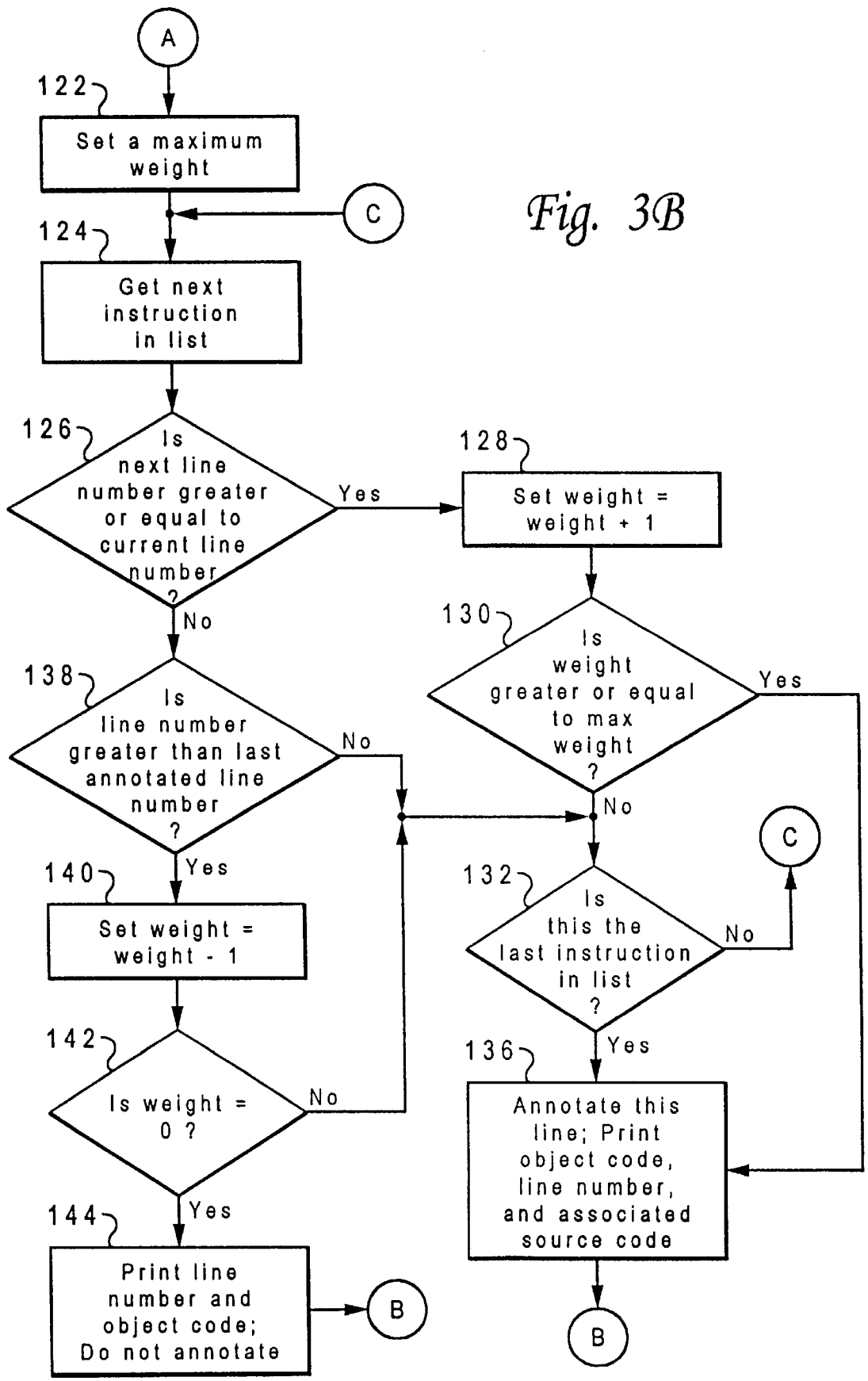

FIG. 3A and 3B together are a high level flow chart depicting the efficient selection of object code instructions to be associated with source code instructions in accordance with the method and system of the present invention. One example of pseudo code which may be utilized to implement the flow chart of FIGS. 3A and 3B is attached as Appendix A. The inventor does not waive any copyright which may exist in this pseudo code separate and apart from any patent rights which may be obtained.

The process of FIGS. 3A and 3B starts as depicted at block 100 and then passes to block 102 which illustrates an association of each line including a source code instruction with a unique line number. Next, the process passes to block 104 which depicts the compilation of the source code instructions. Block 106 illustrates an association of each line of object code with a line of source code. Then, block 108 depicts the association of each line of object code with the line number associated with the line of source code associated with that line of object code.

Block 110 then depicts the loading of object code including the line numbers into a buffer. Therefore, initially the buffer will include an optimized compiler listing of object code instructions. Each object code instruction will have an associated line number which identifies the source code which was compiled to produce that line of object code. Block 112 illustrates for each sequence of consecutive identical line numbers in the buffer, the deleting of all but the first line of object code within the sequence of consecutive identical line numbers. Thereafter, block 114 depicts getting the next line of object code from the buffer. For purposes of describing this flow chart, this instruction is the "current instruction". For the first pass through this flow chart, the first line of object code will be retrieved.

Next, block 116 depicts a determination of whether or not the line number for the current line of object code retrieved as illustrated in block 114 is greater that a line number associated with the last line of object code to be annotated. If a determination is made that the line number of the current line is not greater than the last line of object code to be annotated, the process passes to block 118. Block 118 illustrates the printing of the current line of object code along with the line number associated with this object code instruction.

Referring again to block 116, if a determination is made that the line number of the current line is greater than the last line of object code to be annotated, the process passes to block 120 which depicts the setting of a weight equal to "1". The process then passes to block 122 as depicted through connector A.

Block 122 illustrates the setting of a maximum weight. Any number may be chosen. However, for purposes of this discussion, a preferred maximum weight of 100 has been chosen, which is based on a multiple of the difference between the line number of the last annotated line and the line number of the current line. Next, block 124 depicts the getting of the next instruction in the listing in the optimized sequence. For purposes of describing this flow chart, this instruction is the "next instruction". Thereafter, block 126 illustrates a determination of whether or not the line number of the next instruction is greater than or equal to the line number of the current instruction. If a determination is made that the line number of the next instruction is greater than or equal to the line number of the current instruction, the process passes to block 128.

Block 128 depicts the setting of the weight now being equal to the weight plus "1". Thereafter, block 130 illustrates a determination of whether or not the weight is greater than or equal to the maximum weight. If a determination is made that the weight is greater than or equal to the maximum weight, the process passes to block 136. Referring again to block 130, if a determination is made that the weight is not greater than or equal to the maximum weight, the process passes to block 132 which depicts a determination of whether or not this is last instruction in the listing. If a determination is made that this is not the last instruction in the list, the process passes back to block 124 as illustrated through connector C.

Referring again to block 132, if a determination is made that this is the last instruction in the list, the process passes to block 136 which depicts the annotation of the current line of object code within the listing. The current line of object code, the line number associated with the current line of object code, and the source code which was compiled to generate the current line of object code is printed together. Thereafter, the process passes back to block 114 as illustrated through connector B.

Referring again to block 126, if a determination is made that the line number of the next instruction is not greater than or equal to the line number of the current instruction, the process passes to block 138. Block 138 illustrates a determination of whether or not the line number of the current line is greater than the line number of the last line to be annotated. If a determination is made that the line number of the current line is not greater than the line number of the last line to be annotated, the process passes back to block 132.

Referring again to block 138, if a determination is made that the line number of the current line is greater than the line number of the last line to be annotated, the process passes to block 140 which depicts the setting of the weight now being equal to the weight minus "1". Thereafter, block 142 illustrates a determination of whether or not the weight is equal to "0". If a determination is made that the weight is not equal to "0", the process passes back to block 132. Referring again to block 142, if a determination is made that the weight is equal to "0", the process passes to block 144 which depicts the printing of the current line of object code along with the line number associated with the object code. The current line will not be annotated. The process then passes back to block 114 as illustrated through connector B.

While an illustrative embodiment has been particularly shown and described, it will be understood by those skilled in the art that various changes in form and detail may be made therein without departing from the spirit and scope of the illustrative embodiment.

I claim:

1. A method in a data processing system for efficiently selecting object code instructions to annotate with source code instructions, said data processing system including a plurality of object code instructions included within a listing generated by compiling a plurality of source code instructions utilizing an optimizing compiler, said listing utilized to debug said plurality of source code instructions, said plurality of source code instructions being in a first sequence and said plurality of object code instructions being in an optimized sequence, said method comprising the steps of:

compiling said plurality of source code instructions utilizing said optimizing compiler;

in response to said compilation, generating said listing of said plurality of object code instructions in said optimized sequence;

comparing one of said plurality of object code instructions with a second plurality of said plurality of object code instructions, all of said second plurality of said plurality of object code instructions being located after said one of said plurality of object code instructions in said optimized sequence;

in response to said comparison, determining if an annotation of said one of said plurality of said object code instructions will prohibit a subsequent annotation of a third plurality of said plurality of object code instructions, said third plurality of said plurality of object code instructions being included within said second plurality of said plurality of object code instructions; and in response to a determination that an annotation of said one of said plurality of said object code instructions will not prohibit a subsequent annotation of said third plurality of said plurality of object code instructions, annotating said one of said object code instructions utilizing one of said plurality of source code instructions associated with said one of said object code instructions.

2. The method according to claim 1, wherein said step of comparing further comprises the steps of:

associating a unique line number with each of said plurality of source code instructions;

associating one of said unique line numbers with each of said plurality of object code instructions, wherein said one of said unique line numbers is associated with said each of said plurality of source code instructions which was compiled to generate said each of said plurality of object code instructions; and comparing said one of said plurality of object code instructions with said second plurality of said plurality of object code instructions utilizing said unique line numbers.

3. The method according to claim 2, further comprising modifying said listing by eliminating a fourth plurality of said object code instructions from said listing, wherein said fourth plurality of said object code instructions includes consecutive lines of said plurality of object code instructions which are each associated with a same line number, wherein said modified listing includes a modified sequence.

4. The method according to claim 3, wherein said step of determining if an annotation of said one of said plurality of said object code instructions will prohibit an annotation of said third plurality of said plurality of object code instructions further comprises the step of:

determining a remaining number of said plurality of object code instructions in said modified sequence located after said one of said plurality of object code instructions being associated with a line number which is not less than a line number associated with a last one of said plurality of object code instructions to be annotated.

5. The method according to claim 4, further comprising the step of establishing a maximum number.

6. The method according to claim 5, further comprising the step of in response to a determination that said remaining number is not less than said maximum number, annotating said one of said plurality of object code instructions utilizing said one of said plurality of source code instructions.

7. The method according to claim 6, further comprising the step of in response to a determination that said remaining number is less than said maximum number, prohibiting an annotation of said one of said plurality of object code instructions utilizing said one of said plurality of source code instructions.

8. The method according to claim 1 further including the step of printing said listing, and wherein said step of annotating said one of said object code instructions utilizing said one of said plurality of source code instructions further includes the step of printing said one of said plurality source code instructions and said one of said plurality of object code instructions together.

9. The method according to claim 4 further comprising the step of in response to a determination that an annotation of said one of said plurality of said object code instructions will prohibit a subsequent annotation of said third plurality of said plurality of object code instructions, prohibiting printing of said one of said plurality source code instructions with said one of said plurality of object code instructions.

10. A data processing system for efficiently selecting object code instructions to annotate with source code instructions, said data processing system including a plurality of object code instructions included within a listing generated by compiling a plurality of source code instructions utilizing an optimizing compiler, said listing utilized to debug said plurality of source code instructions, said plurality of source code instructions being in a first sequence and said plurality of object code instructions being in an optimized sequence, comprising:

means for compiling said plurality of source code instructions utilizing said optimizing compiler;

means responsive to said compilation, for generating said listing of said plurality of object code instructions in said optimized sequence;

means for comparing one of said plurality of object code instructions with a second plurality of said plurality of object code instructions, all of said second plurality of said plurality of object code instructions being located after said one of said plurality of object code instructions in said optimized sequence;

means responsive to said comparison, for determining if an annotation of said one of said plurality of said object code instructions will prohibit a subsequent annotation of a third plurality of said plurality of object code instructions, said third plurality of said plurality of object code instructions being included within said second plurality of said plurality of object code instructions; and means responsive to a determination that an annotation of said one of said plurality of said object code instructions will not prohibit a subsequent annotation of third plurality of said plurality of object code instructions, for annotating said one of said object code instructions utilizing one of said plurality of source code instructions associated with said one of said object code instructions.

11. The system according to claim 1, wherein said means for comparing further comprises:

means for associating a unique line number with each of said plurality of source code instructions;

means for associating one of said unique line numbers with each of said plurality of object code instructions, wherein said one of said unique line numbers is associated with said each of said plurality of source code instructions which was compiled to generate said each of said plurality of object code instructions; and means for comparing said one of said plurality of object code instructions with said second plurality of said plurality of object code instructions utilizing said unique line numbers.

12. The system according to claim 11, further comprising means for modifying said listing by eliminating a fourth plurality of said object code instructions from said listing, wherein said fourth plurality of said object code instructions includes consecutive lines of said plurality of object code instructions which are each associated with a same line number, wherein said modified listing includes a modified sequence.

13. The system according to claim 12, wherein said means for determining if an annotation of said one of said plurality of said object code instructions will prohibit an annotation of said third plurality of said plurality of object code instructions further comprises:

means for determining a remaining number of said plurality of object code instructions in said modified sequence located after said one of said plurality of object code instructions being associated with a line number which is not less than a line number associated with a last one of said plurality of object code instructions to be annotated.

14. The system according to claim 13, further comprising means for establishing a maximum number.

15. The system according to claim 14, further comprising means responsive to a determination that said remaining number is not less than said maximum number, for annotating said one of said plurality of object code instructions utilizing one of said plurality of source code instructions.

16. The system according to claim 15, further comprising means responsive to a determination that said remaining number is less than said maximum number, for prohibiting an annotation of said one of said plurality of object code instructions utilizing one of said plurality of source code instructions.

17. The system according to claim 10 further comprising means for printing said listing, and wherein said means for annotating said one of said object code instructions utilizing said one of said plurality of source code instructions further comprises means for printing said one of said plurality source code instructions and said one of said plurality of object code instructions together.

18. The system according to claim 17 further comprising means responsive to a determination that an annotation of said one of said plurality of said object code instructions will prohibit a subsequent annotation of said third plurality of said plurality of object code instructions, for prohibiting printing of said one of said plurality source code instructions with said one of said plurality of object code, instructions.

19. A method in a data processing system for efficiently selecting object code instructions to annotate with source code instructions, said data processing system including a plurality of object code instructions included within a listing generated by compiling a plurality of source code instructions utilizing an optimizing compiler, said plurality of source code instructions being in a first sequence and said plurality of object code instructions being in an optimized sequence, said method comprising the steps of:

compiling said plurality of source code instructions utilizing said optimizing compiler;

in response to said compilation, generating said listing of said plurality of object code instructions in said optimized sequence; and annotating only selected ones of said plurality of object code instructions included in said listing by printing only ones of said plurality of source code instructions which were compiled to generate said selected ones of said plurality object code instructions.

20. The method according to claim 19, further comprising the steps of:

comparing one of said plurality of object code instructions with a second plurality of said plurality of object code instructions, all of said second plurality of said plurality of object code instructions being located after said one of said plurality of object code instructions in said optimized sequence;

said step of comparing comprising the steps of:
associating a unique line number with each of said plurality of source code instructions;
associating one of said unique line numbers with each of said plurality of object code instructions, wherein said one of said unique line numbers is associated with said each of said plurality of source code instructions which was compiled to generate said each of said plurality of object code instructions; and
comparing said one of said plurality of object code instructions with said second plurality of said plurality of object code instructions utilizing said unique line numbers.

21. The method according to claim 20, further comprising modifying said listing by eliminating a fourth plurality of said object code instructions from said listing, wherein said fourth plurality of said object code instructions includes consecutive lines of said plurality of object code instructions which are each associated with a same line number, wherein said modified listing includes a modified sequence.

22. The method according to claim 21, further comprises the step of:

determining a remaining number of said plurality of object code instructions in said modified sequence located after said one of said plurality of object code instructions being associated with a line number which is not less than a line number associated with a last one of said plurality of object code instructions to be annotated.

23. The method according to claim 22, further comprising the step of establishing a maximum number.

24. The method according to claim 23, further comprising the step of in response to a determination that said remaining number is not less than said maximum number, annotating said one of said plurality of object code instructions utilizing said one of said plurality of source code instructions.

* * * * *

UNITED STATES PATENT AND TRADEMARK OFFICE
CERTIFICATE OF CORRECTION

PATENT NO. : 5,946,493
DATED : August 31, 1999
INVENTOR(S) : Scott P. Hanson

It is certified that error appears in the above-identified patent and that said Letters Patent is hereby corrected as shown below:

Claim 10, Column 9, Line 22: "of third" should be
--of said third--.

Signed and Sealed this

Ninth Day of May, 2000

Attest:

Q. TODD DICKINSON

Attesting Officer            Director of Patents and Trademarks